US011201789B1

(12) United States Patent
Keane et al.

(10) Patent No.: US 11,201,789 B1
(45) Date of Patent: Dec. 14, 2021

(54) COORDINATED DEVICE GROUPING IN FOG COMPUTING

(71) Applicants: INTERNATIONAL BUSINESS MACHINES CORPORATION, Armonk, NY (US); NATIONAL UNIVERSITY OF IRELAND MAYNOOTH, Maynooth (IE)

(72) Inventors: Peter Keane, Tallaght (IE); Faisal Ghaffar, Dunboyne (IE); David W. Malone, Maynooth (IE)

(73) Assignees: INTERNATIONAL BUSINESS MACHINES CORPORATION, Armonk, NY (US); NATIONAL UNIVERSITY OF IRELAND MAYNOOTH, Kildare (IE)

( * ) Notice: Subject to any disclaimer, the term of this patent is extended or adjusted under 35 U.S.C. 154(b) by 0 days.

(21) Appl. No.: 17/175,519

(22) Filed: Feb. 12, 2021

(51) Int. Cl.
*H04L 12/24* (2006.01)
*G16Y 30/00* (2020.01)

(52) U.S. Cl.
CPC .......... *H04L 41/0893* (2013.01); *G16Y 30/00* (2020.01); *H04L 41/0803* (2013.01); *H04L 41/0806* (2013.01); *H04L 41/0823* (2013.01); *H04L 41/0886* (2013.01); *H04L 41/12* (2013.01); *H04L 41/22* (2013.01)

(58) Field of Classification Search
CPC ....... H04L 41/08–0806; H04L 41/0823–0836; H04L 41/0876–0893; H04L 41/12; H04L 41/22; H04L 41/5041–5054; G16Y 20/00–40; G16Y 30/00–10
See application file for complete search history.

(56) References Cited

U.S. PATENT DOCUMENTS

2017/0006141 A1  1/2017  Bhadra
2018/0062919 A1  3/2018  Justin et al.
(Continued)

FOREIGN PATENT DOCUMENTS

WO  WO-2020105059 A1 * 5/2020  ............ H04W 84/18

OTHER PUBLICATIONS

A. Chandak and N. K. Ray, "A Review of Load Balancing in Fog Computing," 2019 International Conference on Information Technology (ICIT), 2019, pp. 460-465.*

(Continued)

*Primary Examiner* — Brendan Y Higa
(74) *Attorney, Agent, or Firm* — Cuenot, Forsythe & Kim, LLC (57) ABSTRACT

An augmented connection graph can be created based on a task to be performed by a fog computing node by augmenting a connection graph representing plurality of IoT devices and connections among them. The augmenting can include adding to the connection graph data type nodes representing types of data processed by the fog computing node and adding connections between the data type nodes and IoT devices that generate the type of data represented by the respective data type nodes. A connection can be added between each pair of the IoT devices that are not currently connected and for which a level of correlation between the pair of IoT devices at least equals a threshold value. Based on the augmented connection graph, at least one of the IoT devices to assign to the fog computing node can be determined and assigned to the fog computing node.

20 Claims, 6 Drawing Sheets

(56) References Cited

U.S. PATENT DOCUMENTS

| | | | |
|---|---|---|---|
| 2018/0270121 A1 | 9/2018 | Stringfellow | |
| 2018/0316555 A1* | 11/2018 | Salgueiro | H04L 41/16 |
| 2018/0375750 A1* | 12/2018 | Moeller | G06Q 10/0838 |
| 2019/0239048 A1 | 8/2019 | Nuttall et al. | |
| 2019/0349426 A1* | 11/2019 | Smith | H04L 41/12 |
| 2021/0157316 A1* | 5/2021 | Liu | G05D 1/0212 |

OTHER PUBLICATIONS

H. Sami and A. Mourad, "Dynamic On-Demand Fog Formation Offering On-the-Fly IoT Service Deployment," in IEEE Transactions on Network and Service Management, vol. 17, No. 2, pp. 1026-1039, Jun. 2020.*

Lee, J.; Lee, J. Hierarchical Mobile Edge Computing Architecture Based on Context Awareness. Appl. Sci. 2018, 8, 1160. https://doi.org/10.3390/app8071160.*

F. Haider, D. Zhang, M. St-Hilaire and C. Makaya, "On the Planning and Design Problem of Fog Computing Networks," in IEEE Transactions on Cloud Computing, vol. 9, No. 2, pp. 724-736, Apr. 1-Jun. 2021.*

Salihbegovic, A. et al., "Design of a domain specific language and IDE for Internet of things applications," In 2015 38th International Convention on Information and Communication Technology, Electronics and Microelectronics (MIPRO) May 2015, pp. 996-1001, IEEE.

Lee, J. et al., "Hierarchical Mobile Edge Computing Architecture Based on Context Awareness," Applied Sciences, vol. 8, No. 7, Jul. 2018, p. 1160 (12 pg.).

Zhang, J. et al., "Enterprise social link recommendation," In Proceedings of the 24th ACM International Conference on Information and Knowledge Management, Oct. 17, 2015, pp. 841-850.

Brandão, M.A. et al., "The strength of co-authorship ties through different topological propertie," Journal of the Brazilian Computer Society, Dec. 2017, vol. 23, No. 1, pp. 1-11.

Wang, X. et al., "A comparative study of team formation in social networks," In International Conference on Database Systems for Advanced Applications, Apr. 20, 2015, pp. 389-404, Springer, Cham.

Tang, J. et al., "Cross-domain collaboration recommendation," In Proceedings of the 18th ACM SIGKDD International Conference on Knowledge Discovery and Data Mining, Aug. 12, 2012, pp. 1285-1293.

Gertler, M.S. et al., "Local nodes in global networks: the geography of knowledge flows in biotechnology innovation," Industry and Innovation, Dec. 1, 2005, vol. 12, No. 4, pp. 487-507.

Iorga, M. et al., "Fog Computing Conceptual Model," NIST Special Publication (SP) 500-325, National Institute of Standards and Technology, Mar. 2018, 14 pg.

Lappas, T. et al. "Finding a team of experts in social networks," In Proceedings of the 15th ACM SIGKDD International Conference on Knowledge Discovery and Data Mining, Jun. 28, 2009, pp. 467-476.

Wu, S. et al., "Patent partner recommendation in enterprise social networks," In Proceedings of the Sixth ACM International Conference on Web Search and Data Mining, Feb. 4, 2013, pp. 43-52.

* cited by examiner

Automatically create an augmented connection graph based on a task to be performed by a particular fog computing node by augmenting a connection graph representing plurality of Internet of Things (IoT) devices and connections among the plurality of IoT devices
705

↓

Automatically add to the augmented connection graph a connection between each pair of the IoT devices that are not currently connected and for which a level of correlation between the pair of IoT devices at least equals a threshold value
710

↓

Based on the augmented connection graph, determine at least one of the plurality of IoT devices to assign to the particular fog computing node
715

↓

Automatically assign the at least one of the plurality of IoT devices to the particular fog computing node
720

FIG. 7

COORDINATED DEVICE GROUPING IN FOG COMPUTING

BACKGROUND

The present invention relates to computer networking, and more specifically, to fog computing.

Fog computing is a network architecture that uses computing units to locally carry out a significant amount of computation, storage, and communication of data generated by various local devices prior to the data being routed over the Internet, for example to cloud-based servers. Many local devices generate large amounts of raw data, for example from sensors. Rather than forward all of that data to cloud-based servers, fog computing is implemented to perform a significant amount of processing on that data locally and forward the processed data to the cloud-based servers rather than the raw data.

SUMMARY

A method includes automatically creating an augmented connection graph based on a task to be performed by a particular fog computing node by augmenting a connection graph representing plurality of Internet of Things (IoT) devices and connections among the plurality of IoT devices. Augmenting the connection graph can include adding to the connection graph a plurality of data type nodes, each of the plurality of data type nodes representing a respective type of data processed by the particular fog computing node and, for each of the plurality of data type nodes, adding to the connection graph a connection between the data type node and each of the plurality of IoT devices that generate the type of data represented by that data type node. The method also can include automatically adding to the augmented connection graph a connection between each pair of the IoT devices that are not currently connected and for which a level of correlation between the pair of IoT devices at least equals a threshold value. The method also can include, based on the augmented connection graph, automatically determining at least one of the plurality of IoT devices to assign to the particular fog computing node. The method also can include automatically assigning, using a processor, the at least one of the plurality of IoT devices to the particular fog computing node.

A system includes a processor programmed to initiate executable operations. The executable operations include automatically creating an augmented connection graph based on a task to be performed by a particular fog computing node by augmenting a connection graph representing plurality of Internet of Things (IoT) devices and connections among the plurality of IoT devices. Augmenting the connection graph can include adding to the connection graph a plurality of data type nodes, each of the plurality of data type nodes representing a respective type of data processed by the particular fog computing node and, for each of the plurality of data type nodes, adding to the connection graph a connection between the data type node and each of the plurality of IoT devices that generate the type of data represented by that data type node. The executable operations also can include automatically adding to the augmented connection graph a connection between each pair of the IoT devices that are not currently connected and for which a level of correlation between the pair of IoT devices at least equals a threshold value. The executable operations also can include, based on the augmented connection graph, automatically determining at least one of the plurality of IoT devices to assign to the particular fog computing node. The executable operations also can include automatically assigning the at least one of the plurality of IoT devices to the particular fog computing node.

A computer program product includes a computer readable storage medium having program code stored thereon. The program code is executable by a data processing system to initiate operations. The operations include automatically creating an augmented connection graph based on a task to be performed by a particular fog computing node by augmenting a connection graph representing plurality of Internet of Things (IoT) devices and connections among the plurality of IoT devices. Augmenting the connection graph can include adding to the connection graph a plurality of data type nodes, each of the plurality of data type nodes representing a respective type of data processed by the particular fog computing node and, for each of the plurality of data type nodes, adding to the connection graph a connection between the data type node and each of the plurality of IoT devices that generate the type of data represented by that data type node. The operations also can include automatically adding to the augmented connection graph a connection between each pair of the IoT devices that are not currently connected and for which a level of correlation between the pair of IoT devices at least equals a threshold value. The operations also can include, based on the augmented connection graph, automatically determining at least one of the plurality of IoT devices to assign to the particular fog computing node. The operations also can include automatically assigning the at least one of the plurality of IoT devices to the particular fog computing node.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

The arrangements described herein are directed to computer technology, and provide an improvement to fog computing. In accordance with the arrangements described herein, groups of Internet of Things (IoT) devices can be defined and each group can be allocated to a particular fog computing node. In this regard, each IoT device within a particular group can communicate data to the fog computing node to which the group is assigned.

In illustration, a particular fog computing node can be configured to process one or more particular types of data. Edge devices that generate that type of data can be assigned to a group and can be communicatively linked to the fog computing node using the most direct communication path that is available. Other IoT devices can be assigned to other fog computing nodes configured to process the type of data they generate and communicatively linked to those other fog computing nodes using the most direct communication paths that are available. Accordingly, the number of types of data each fog computing node is configured to process can be minimized (e.g., below a threshold value). This optimizes the efficiency of each fog computing node at executing the program utilities, reducing energy usage by each fog computing node, and minimizes the amount of local memory used by each fog computing node.

Moreover, since the IoT devices are communicatively linked to the fog computing nodes using the most direct paths, fewer communication links are required to communicate data from the IoT devices to the fog computing nodes, thus minimizing total network bandwidth usage. Indeed, a plurality of IoT devices in a particular group can be communicatively linked, and one of those IoT devices can be tasked with communicating data for itself and on behalf of other IoT devices to which it is communicatively linked. Accordingly, the number of communication links between IoT devices and the fog computing node can be minimized, thus minimizing the data processing resources of the fog computing node required to establish and maintain communication sessions with the IoT devices.

Further, since each fog computing node only processes a limited number of data types, the number of cloud computing nodes to which each fog computing node communicates can be minimized. Specifically, different cloud computing nodes may be configured to process and store certain types of data. If a fog computing node processes types of data that must be sent to multiple cloud computing nodes, the fog computing node must establish connections with each of those cloud computing nodes. By minimizing the types of data the fog computing node will process, the number of cloud computing nodes with which the fog computing node must establish communication links can be minimized. For example, the fog computing node may need only communicate processed data to a single cloud computing node. Not only does this reduce the processing resources on the fog computing node that otherwise would be required to maintain connections to multiple cloud computing nodes, this also reduces the amount of network bandwidth utilized by each fog computing node, thus reducing overall network usage and latency. Further, energy usage by the fog computing node and by the communication network(s) is reduced in comparison to conventional fog computing schemes.

Several definitions that apply throughout this document now will be presented.

As defined herein, the term "fog computing node" means a data processing system, including at least one processor and memory, deployed within a fog computing environment.

As defined herein, the term "cloud computing node" means a data processing system, including at least one processor and memory, deployed within a cloud computing environment. A "cloud computing node" is not a "fog computing node," and a "fog computing node" is not a "cloud computing node."

As defined herein, the term "IoT device" means hardware that includes, or is communicatively linked to, at least one sensor and is configured to transmit data generated by the sensor to one or more data processing systems via at least one communication network. As the term "IoT device" is defined herein, a computer is not an IoT device, a mobile phone is not an IoT device, and a tablet computer is not an IoT device.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "automatically" means without user intervention.

As defined herein, the term "user" means a person (i.e., a human being).

It is to be understood that although this disclosure includes a detailed description on fog computing, implementation of the teachings recited herein are not limited to a fog computing environment. Rather, embodiments of the present invention are capable of being implemented in conjunction with any other type of computing environment now known or later developed.

Fog computing is a layered model for enabling ubiquitous access to a shared continuum of scalable computing resources. The model facilitates the deployment of distributed, latency-aware applications and services, and consists of fog computing nodes (physical or virtual), residing between smart end-devices and centralized (cloud) services. The fog computing nodes are context aware and support a common data management and communication system. They can be organized in clusters—either vertically (to support isolation), horizontally (to support federation), or relative to fog computing nodes' latency-distance to the smart end-devices. Fog computing minimizes the request-response time from/to supported applications, and provides, for the end-devices, local computing resources and, when needed, network connectivity to centralized services.

This fog model may include at least six characteristics, at least three service models, and at least one deployment model.

Characteristics are as follows:

Contextual location awareness, and low latency: Fog computing offers the low latency due to the fog computing nodes' awareness of their logical location in the context of the entire systems and of the latency costs for communicating with other nodes. Because fog computing nodes are often co-located with the smart end-devices, analysis and response to data generated by these devices is much quicker than from a centralized cloud service or data center.

Geographical distribution: In sharp contrast to the more centralized cloud, the services and applications targeted by the fog computing can include widely, but geographically-identifiable, distributed deployments. For instance, the fog computing plays an active role in delivering high quality streaming services to moving vehicles, through proxies and access points geographically positioned along highways and tracks.

Heterogeneity: Fog computing supports collection and processing of data of different form factors acquired through multiple types of network communication capabilities.

Interoperability and federation: Seamless support of certain services (real-time streaming services is a good example) involves the cooperation of different providers. Hence, fog computing components can interoperate, and services can be federated, across domains.

Real-time interactions: Fog computing applications involve real-time interactions rather than batch processing.

Scalability and agility of federated, fog-node clusters: Fog computing is adaptive in nature, at cluster or cluster-of-clusters level, supporting elastic compute, resource pooling, data-load changes, and network condition variations, to list a few of the supported adaptive functions.

Additional characteristics that optionally can be implemented are as follows:

Predominance of wireless access: Although fog computing is used in wired environments, the large scale of wireless sensors in IoT demand distributed analytics and compute. For this reason, fog computing is very well suited to wireless IoT access networks.

Support for mobility: It is essential for many fog computing applications to communicate directly with mobile devices, and therefore support mobility techniques, such as the Locator/ID Separation Protocol (LISP), that decouple host identity from location identity, and require a distributed directory system.

To facilitate the deployment of a fog computing capability that exhibits the characteristics described above, fog computing nodes can be configured to support one or more fog computing node attributes.

Fog computing node Attributes are as follows:

Autonomy: Fog computing nodes can operate independently, making local decisions, at the node or cluster-of-nodes level.

Heterogeneity: Fog computing nodes come in different form factors, and can be deployed in a wide variety of environments.

Hierarchical clustering: Fog computing nodes support hierarchical structures, with different layers providing different subsets of service functions while working together as a continuum.

Manageability: Fog computing nodes are managed and orchestrated by complex systems that can perform most routine operations automatically.

Programmability: Fog computing nodes are inherently programmable at multiple levels, by multiple stakeholders—such as network operators, domain experts, equipment providers, or end users.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private fog computing node: A fog computing node that is provisioned for exclusive use by a single organization comprising multiple consumers (e.g., business units.) It may be owned, managed, and operated by the organization, a third party, or some combination of them, and it may exist on or off premises.

Community fog computing node: A fog computing node that is provisioned for exclusive use by a specific community of consumers from organizations that have shared concerns (e.g., mission, security requirements, policy, and compliance considerations.) It may be owned, managed, and operated by one or more of the organizations in the community, a third party, or some combination of them, and it may exist on or off premises.

Public fog computing node: A fog computing node that is provisioned for open use by the general public. It may be owned, managed, and operated by a business, academic, or government organization, or some combination of them. It exists on the premises of the fog provider.

Hybrid fog computing node: A complex fog computing node that is a composition of two or more distinct fog computing nodes (private, community, or public) that remain unique entities, but are bound together by standardized or proprietary technology that enables data and application portability (e.g., fog bursting for load balancing between these fog computing nodes.)

In some arrangements, one or more light weight computing nodes, known as mist nodes, can form a mist computing layer within the fog computing environment. A mist node is a dedicated node that exhibits low computational resources and is placed closer to the peripheral devices than the more powerful fog computing nodes with which they collaborate. In this regard, mist nodes often share the same locality with the smart end-devices they service.

Mist computing is a lightweight and rudimentary form of fog computing that resides directly within the network fabric at the edge of the network fabric, bringing the fog computing layer closer to the smart end-devices. Mist computing uses microcomputers and microcontrollers to feed into fog computing nodes and potentially onward towards the centralized (cloud) computing services. The mist computing layer is not a mandatory layer of fog computing. When implemented, mist nodes can leverage the deployment models of fog computing described above.

For the purpose of this specification, Edge computing is the network layer encompassing the end devices, to provide, for example, local computing capability on a sensor, metering or some other devices that are network-accessible. This peripheral layer is also often referred to as an IoT network. Fog computing is often erroneously confused with edge computing, but there are key differences between the two concepts. Fog computing runs applications in a multi-layer architecture that decouples and meshes the hardware and software functions, allowing for dynamic reconfigurations for different applications while performing intelligent computing and transmission services. Edge computing, on the other hand, runs specific applications in a fixed logic location and provides a direct transmission service. Fog computing is hierarchical, whereas edge computing tends to be limited to a small number of peripheral devices. Moreover, in addition to computation, and networking, fog computing also addresses storage, control and data-processing acceleration.

Figure 1:
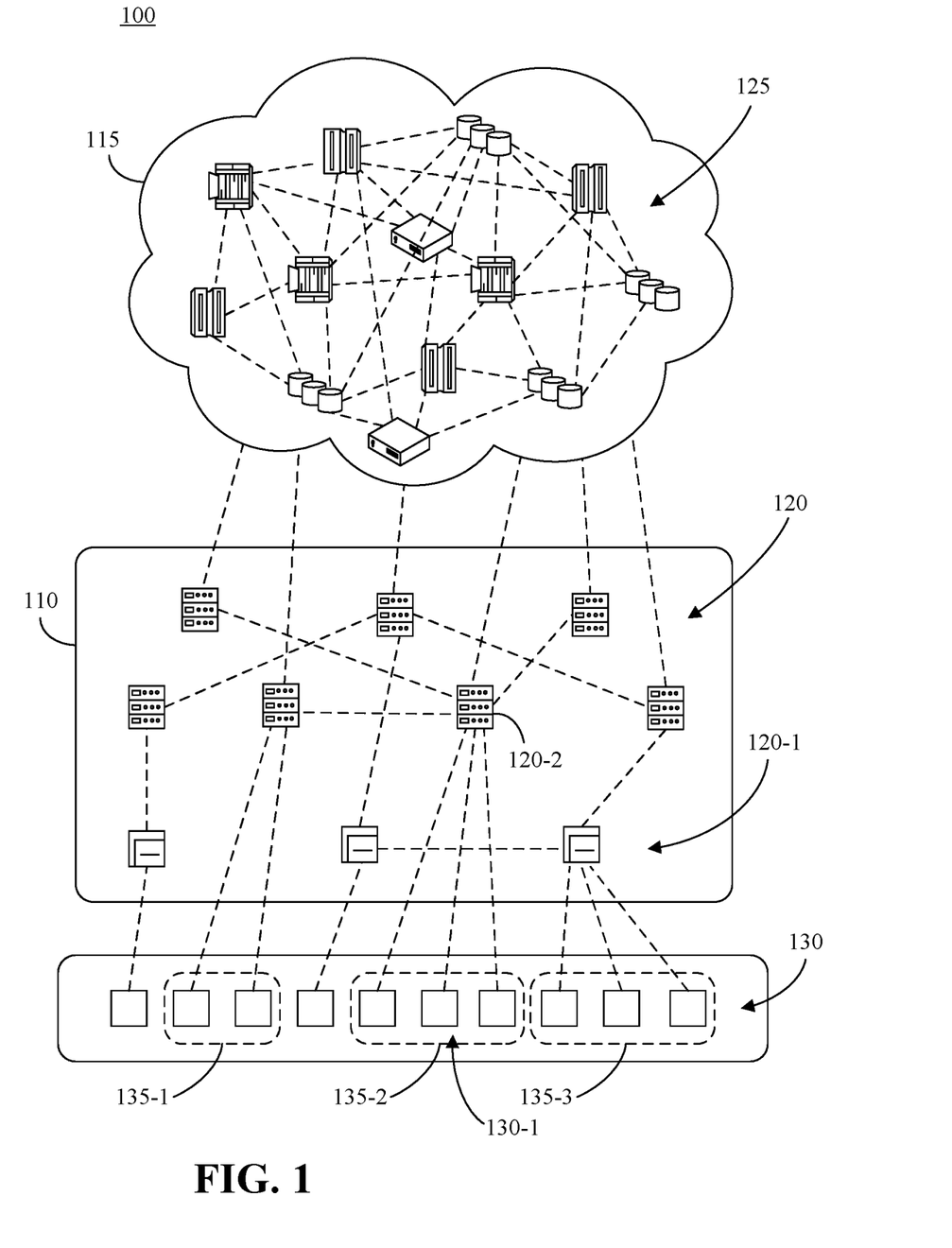
FIG. 1 depicts an example computing environment.

Referring now to FIG. 1, an illustrative computing environment 100 is depicted. As shown, the computing environment 100 includes a fog computing environment 110 communicatively linked to a cloud computing environment 115 via one or more communication networks, for example the Internet, one or more wide area networks (WANs), one or more local area networks (LANs), one or more wireless networks, one or more Virtual Private Networks (VPNs), the Public Switched Telephone Network (PSTN), etc.

The fog computing environment 110 can include a plurality of fog computing nodes 120. The fog computing nodes 120 may communicate with one another. They may be grouped (not shown) physically or virtually, in one or more networks, such as Private, Community, Public, or Hybrid fog clusters as described hereinabove, or a combination thereof. This allows the fog computing environment 110 to offer data management and data communication. It is understood that the types of computing devices shown in FIG. 1 are intended to be illustrative only and that fog computing nodes 120 and fog computing environment 110 can communicate with any type of computerized device over any type of network and/or network addressable connection.

Optionally, one or more of the fog computing nodes 120 can be mist computing nodes 120-1. As noted, the mist computing nodes 120-1 can be dedicated nodes that exhibit low computational resources. In this regard, mist computing nodes 120-1 can be perceived as lightweight fog computing nodes 120.

The cloud computing environment 115 can include one or more cloud computing nodes 125 with which the fog computing nodes 120 may communicate. The cloud computing nodes 125 may communicate with one another. They may be grouped (not shown) physically or virtually, in one or more networks, such as Private, Community, Public, or Hybrid clouds as described hereinabove, or a combination thereof. This allows the cloud computing environment 115 to offer infrastructure, platforms and/or software as services for which a cloud consumer does not need to maintain resources on a local computing device. It is understood that the types of computing devices shown in FIG. 1 are intended to be illustrative only and that cloud computing nodes 125 and computing cloud computing environment 115 can communicate with any type of computerized device over any type of network and/or network addressable connection. In this regard, one or more of the fog computing nodes 120 can be communicatively linked to one or more of the cloud computing nodes 125 via the one or more communication networks.

The computing environment 100 also includes a plurality of IoT devices 130. The IoT devices 130 can be, for example, IoT devices. Each IoT device 130 can include a network adapter and a controller or processor. Optionally, one or more IoT devices 130 can include local memory and/or a bulk storage device. In an arrangement, one or more of the IoT devices 130 can be simple devices acting as data producers and/or data consumers. In illustration, an IoT device 130 can be configured to, via a controller or processor, collect raw data from one or more sensors and communicate the raw data to a fog computing node 120. In an arrangement, one or more of the IoT devices 130 can be smart devices enriched with information technology capacities. For example, an IoT device 130 can collect raw data from one or more sensors, process the raw data using a controller or processor, and communicate to a fog computing node 120 results of processing the raw data. Moreover, one or more IoT devices 130 can collect data from other IoT devices 130 and communicate such data to one or more fog computing nodes 120. In this regard, a plurality of IoT devices 130 can be communicatively linked together, for example via one or more WANs, one or more LANs, one or more wireless networks, one or more VPNs, the PSTN etc. Further, one or more of the IoT devices 130 can be communicatively linked to the fog computing environment 110. In illustration, each IoT device 130 can be communicatively linked to one or more fog computing nodes 120 via one or more WANs, one or more LANs, one or more wireless networks, one or more VPNs, the PSTN etc.

Figure 2:
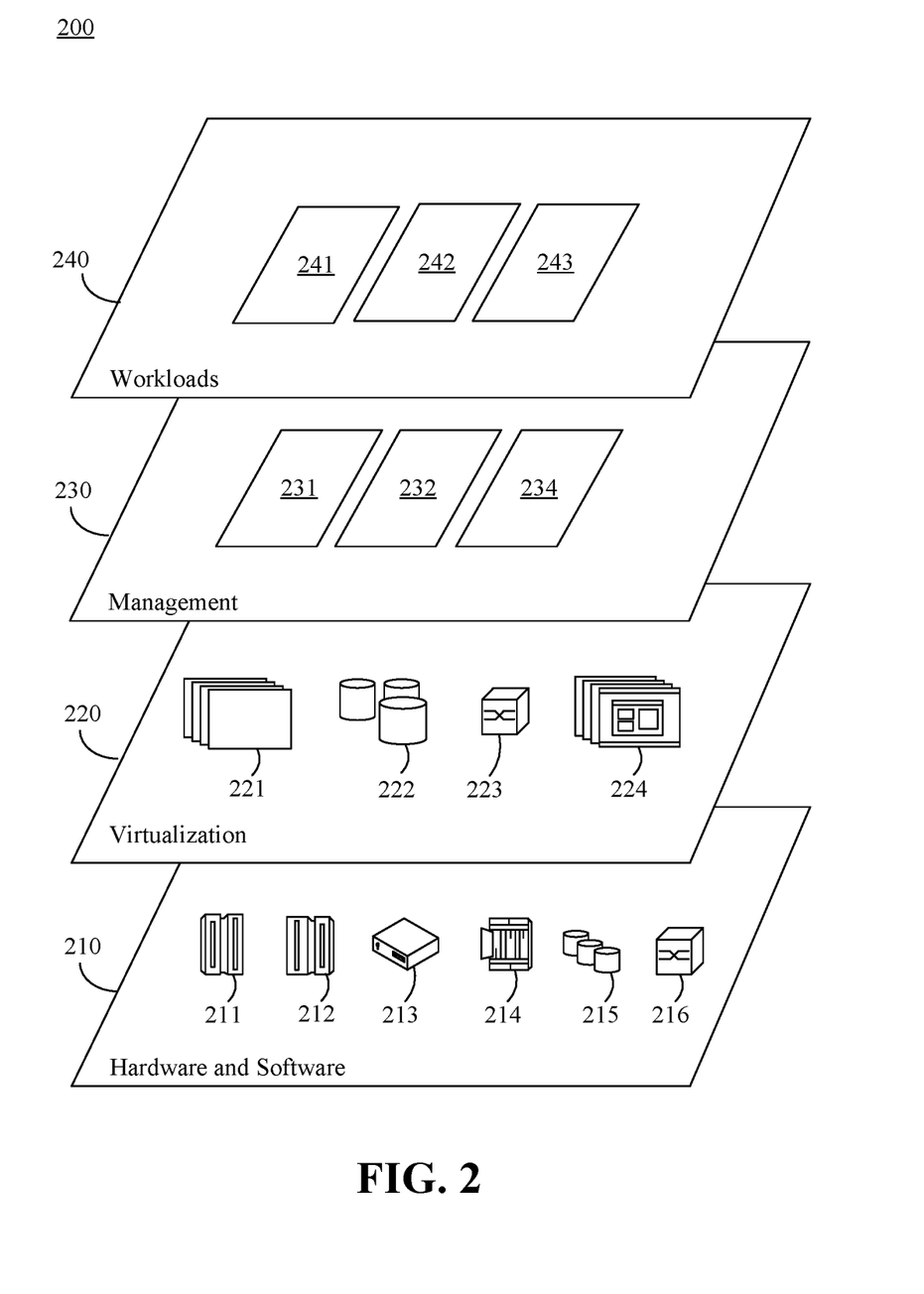
FIG. 2 depicts example abstraction model layers of a fog computing environment.

Referring now to FIG. 2, a set of functional abstraction layers 200 provided by the fog computing environment 110 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 210 includes hardware and software components. Examples of hardware components include: mainframes 211; RISC (Reduced Instruction Set Computer) architecture based servers 212; servers 213; blade servers 214; storage devices 215; and networks and networking components 216, such as gateways, switches, routers, etc.

Virtualization layer 220 provides an abstraction layer from which the following examples of virtual entities may be provided: virtual servers 221; virtual storage 222; virtual networks 223, including virtual private networks; and virtual applications and operating systems 224.

In an example, management layer 230 may provide the functions described below. Security 231 provides authentication IoT devices 130, as well as protection for data and other resources. Data handling 232 provides data communication and data storage. Resource management 233 provides management of fog computing resources, including IoT device resource allocation and provisioning.

Workloads layer 240 provides examples of functionality for which the fog computing environment 110 may be utilized. Examples of workloads and functions which may be provided from this layer include transaction processing 241, data processing 242 and artificial intelligence 253. Data processing 242 can include, for example, data aggregation, data cleaning, data transformation, etc. of data received from IoT devices 130. Artificial intelligence 243 can include, for example, one or more classifiers trained using artificial intelligence. A classifier is a functional data structure that implements pattern recognition in machine learning. A classifier can include, for example, one or more algorithms that sort data into labeled classes or categories of information. A classifier also can include one or more algorithms that assigns values, weights and/or scores to data.

Figure 3:
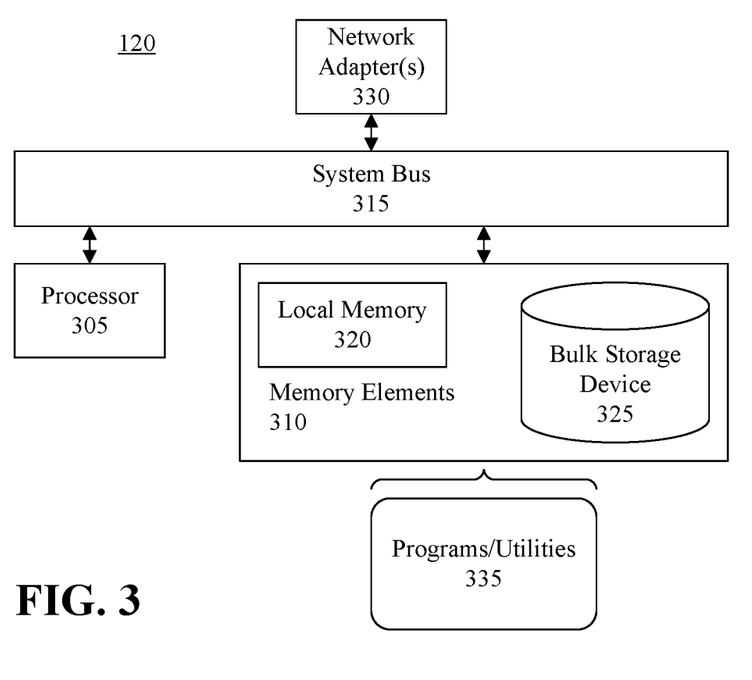
FIG. 3 is a block diagram illustrating example architecture for a fog computing node.

FIG. 3 is a block diagram illustrating example architecture for a fog computing node 120. The fog computing node 120 can include at least one processor 305 (e.g., a central processing unit) coupled to memory elements 310 through a system bus 315 or other suitable circuitry. As such, the fog computing node 120 can store program code within the memory elements 310. The processor 305 can execute the program code accessed from the memory elements 310 via the system bus 315. It should be appreciated that the fog computing node 120 can be implemented in the form of any system including a processor and memory that is capable of performing the functions and/or operations described within this specification. For example, the fog computing node 120 can be implemented as a server, a network appliance, and so on.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The fog computing node 120 also can include one or more cache memories (not shown) that provide temporary storage of at least some program code in order to reduce the number of times program code must be retrieved from the local memory 320 and/or bulk storage device 325 during execution.

One or more network adapters 330 can be coupled to fog computing node 120 to enable the fog computing node 120 to become coupled to IoT devices, other systems, computer systems, and/or remote storage devices through intervening private or public networks. Modems, cable modems, transceivers, and Ethernet cards are examples of different types of network adapters 330 that can be used with the fog computing node 120.

As pictured in FIG. 3, the memory elements 310 can store the components of the fog computing node 120, namely programs and/or utilities 335. Being implemented in the form of executable program code, the programs and/or utilities 335 can be executed by the fog computing node 120 and, as such, can be considered part of the fog computing node 120. Moreover, the programs and/or utilities 335 are functional data structures that impart functionality when employed as part of the fog computing node 120.

In illustration, the fog computing node 120 can include a program or utility 335 configured to process a particular type data received from IoT devices 130 assigned to the fog computing node 120. Referring briefly to FIG. 1, at least one of the fog computing nodes 120 further can include a program/utility 335 configured to determine optimal groupings of IoT devices 130, assign the IoT devices 130 to groups, and communicate configuration data to the IoT devices 130. The configuration data can be used by the IoT devices 130 to communicatively link to the fog computing nodes 120 to which they are assigned based on their groupings.

Figure 4:
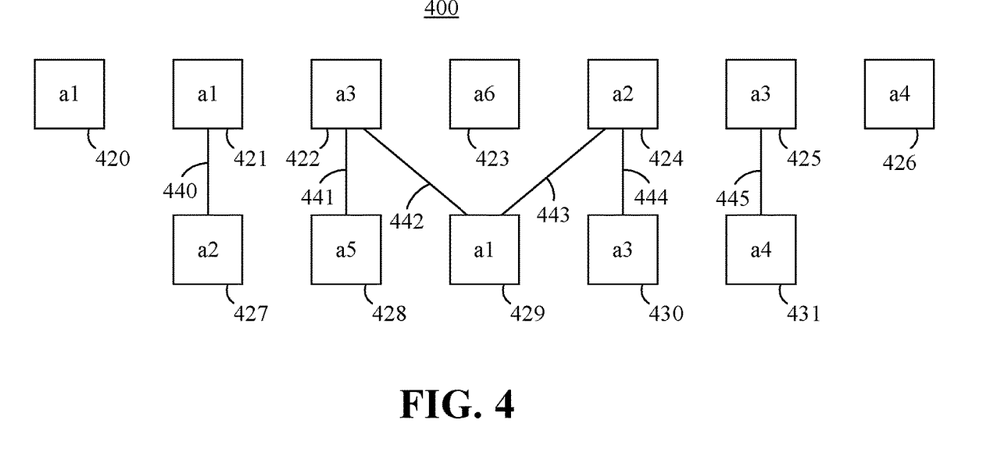
FIG. 4 is an example connection graph depicting connections among a plurality of IoT devices.

FIG. 4 is an example connection graph 400 depicting connections among a plurality of IoT devices 420, 421, 422, 423, 424, 425, 426, 427, 428, 429, 430, 431, each of which transmits data to a fog computing node 120 (FIG. 1). The connection graph 400 also can indicate types of data generated by the respective IoT devices 420-431, for example data types a1, a2, a3, a4, a5, and a6.

Some of the IoT devices 420-431 presently may be communicatively linked to one another. The connection graph 410 can represent such communication links using edges 440, 441, 442, 443, 444, 445. In this regard, the connection graph 400 can be defined as G=(V,E), where V is the set of IoT devices 420-431 and E is the set of edges 440-445 connecting IoT devices 420-431 that are presently communicatively linked to one another. Hereinafter, a communication link represented by an edge 440-445 may be referred to by the callout number assigned to the edge representing that communication link.

In an arrangement, a fog computing node 120 (FIG. 1) can automatically create the connection graph 400 based on analyzing data received from the IoT devices 420-431 and, based on that analysis, determine which IoT devices 420-431 currently are communicating data directly to fog computing node 120 and which IoT devices 420-431 currently are communicating data to the fog computing node 120 via other IoT devices 420-430. Further, the fog computing node 120 can identify the other IoT devices 420-431 through which data is communicated in order to generate the edges 440-445. The fog computing node 120 also can determine the type of data generated by each of the IoT devices 420-431. In another arrangement, another data processing system, for example a cloud computing node 125 or other data processing device, can receive from the fog computing node 120 data indicating the IoT devices 420-431, data types and data paths, and generate the connection graph 400.

The connection graph 400 is pictorially depicted in FIG. 4, but it will be understood by those of ordinary skill in the art that the connection graph 400 can be created as a computer-readable data structure indicating the respective components 420-445 of the connection graph 400 and their respective positions/connections in the connection graph 400.

Figure 5:
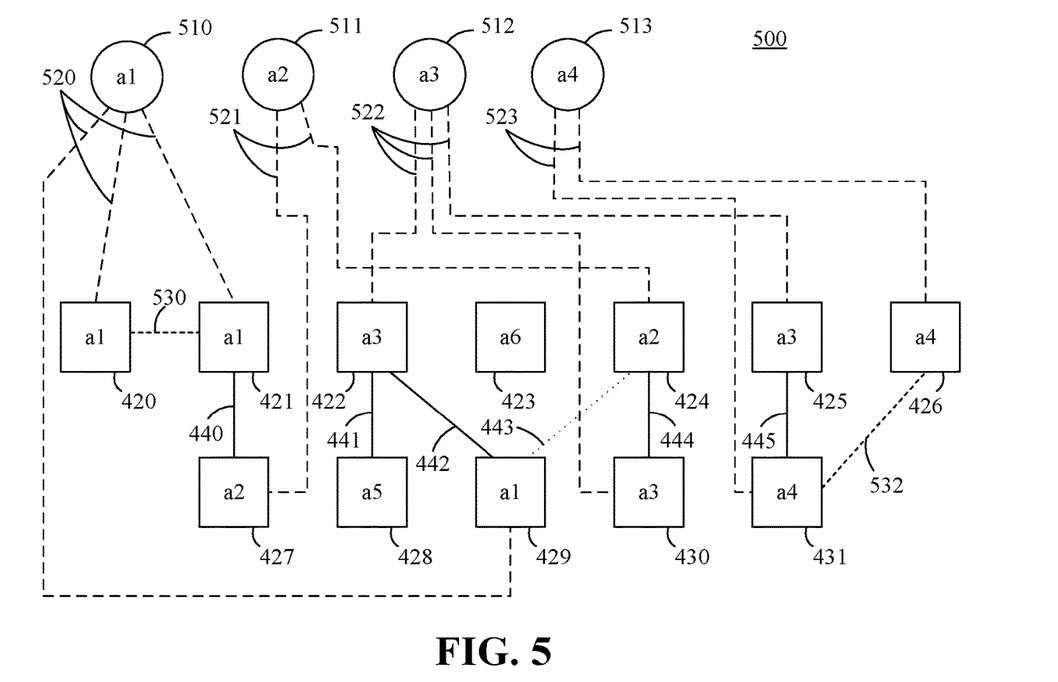
FIG. 5 is an example augmented connection graph.

FIG. 5 is an example augmented connection graph 500 created based on the connection graph 400. A fog computing node 120 (FIG. 1), for instance an application executing on the fog computing node 120, can automatically analyze the connection graph 400 (FIG. 4) and determine a set of data types that are required by a particular fog computing node 120, which may be that fog computing node 120 or another fog computing node 120. In another arrangement, the fog computing node 120, for instance an application executing on the fog computing node 120, can receive data from IoT devices 420-431 that are communicatively linked to the fog computing node 120, and determine a set of data types that are required by that fog computing node 120. In yet another arrangement, another data processing system, for example a cloud computing node 125 or other data processing device, can receive and analyze the connection graph 400 (FIG. 4) and determine the set of data types that are required by the particular fog computing node 120.

For purposes of illustration, in this example assume that the fog computing node 120 for which the augmented connection graph 500 is being created requires a set A of data types a1, a2, a3, a4 for operations (e.g., processing of one or more workloads) performed by the fog computing node 120. The augmented connection graph 500 can be automatically created from the connection graph 400. The fog computing node 120 (or cloud computing node 125 or other data processing system) tasked with creating the augmented connection graph 500 can add to the augmented connection graph 500 data type nodes (hereinafter "nodes") 510, 511, 512, 513 representing the respective datatypes a1, a2, a3, a4 required by the fog computing node 120 for which the augmented connection graph 500 is being created. Further, the fog computing node 120 (or cloud computing node 125 or other data processing system) tasked with creating the augmented connection graph 500 can add connections between node 510, 511, 512, 513 and each IoT device 420-431 that creates and/or otherwise transmits data having a datatype assigned to the respective node 510-513. In illustration, connections 520 between the node 510 and the IoT devices 420, 421, 429 can be added, connections 521 between the node 511 and the IoT devices 424, 427 can be added, connections 522 between the node 512 and the IoT devices 422, 425, 430 can be added, and connections 523 between the node 513 and the IoT devices 426, 411 can be added. In this example, the fog computing node 120 for which the augmented connection graph 500 is being created does not require data types a5, a6, and thus nodes and connections for those data types need not be added to the augmented connection graph 500.

In this example, assume IoT device 424 receives sensor data type a2 from a sensor, and transmits data corresponding data to a fog computing node 120. Also assume that IoT device 429 receives sensor data type a1 from a different sensor, and IoT device 430 receives data type a3 from yet another sensor, but the IoT devices 429, 430 transmit their respective data to the fog computing node 120 via the IoT device 424. Since the IoT device 424 is not the originator of the data types a1, a3 transmitted by the IoT devices 429, 430, connections between the IoT device 424 and the nodes 510, 512 for data types a1, a3 need not be created. Similarly, a connection between IoT device 422 and node 510 need not be created since the IoT device 422 is not the originator of the datatype a1 transmitted by the IoT device 429 to the fog computing node 120 via the IoT device 422.

Using the augmented connection graph 500, the fog computing node 120 (or another fog computing node, cloud computing node 125 or other data processing system) can automatically determine pairwise similarity between IoT devices 420-431. Based on the determined pairwise similarity between IoT devices 420-431, the fog computing node 120 can determine whether IoT devices 420-431 are correlated. A pair of IoT devices 420-431 is determined to be correlated if a correlation score assigned to that pair of IoT devices 420-431 is equal to or higher than a threshold correlation value. The correlation score for each pair of IoT devices 420-431 can be determined based on user defined parameters, for example a determined signal strength of a communications between the pair of IoT devices 420-431, a determination of whether the pair of IoT devices 420-431 currently are communicatively linked, previously were communicatively linked or have not been communicatively linked, a determined proximity of the pair of IoT devices 420-431 to one another, and/or a determined similarity of type(s) of data generated and/or communicated by each of the pair of IoT devices 420-431.

For example, a signal strength score can be assigned to the signal strength of communications between the pair of IoT devices 420-431, a connection score assigned to a connection status of the IoT devices 420-431, a proximity score can be assigned to proximity of the pair of IoT devices 420-431 to one another, and a data score can be assigned to the similarity of type(s) of data generated and/or communicated by each of the pair of IoT devices 420-431. The correlation score can be derived from the signal strength score, the proximity score and/or the data score. For example, the correlation score can be a sum of the signal strength score, the proximity score and/or the data score. In another example, a weighting can be assigned to each of the signal strength score, the proximity score and/or the data score, and the correlation score can be a sum of the weighted signal strength score, the weighted proximity score and/or the weighted data score. Further, the correlation score can be normalized to be a value in a range from zero to one.

In illustration, the signal strength score can be determined to be a value in a range from zero to one, where zero represents a signal strength below a first signal strength threshold value (e.g., a minimum signal strength required for the IoT devices to successfully communicate with one another) and one represents a signal strength above a second signal strength threshold value (e.g., an expected maximum possible signal strength between the IoT devices if the IoT devices were located within a threshold distance of one another).

The connection score can be determined to be a value in a range from zero to one, where zero represents a condition that a pair of IoT devices have not been communicatively linked and one represents a condition that the pair of IoT devices currently are communicatively linked. A score of 0.5 can indicate that the pair of IoT devices previously were communicatively linked, but currently are not communicatively linked.

The proximity of a pair of IoT devices 420-431 can be determined, for example, based on a physical distance between their respective physical locations and/or a number of other devices (e.g., access points, routers, switches, data processing systems, etc.) through which communications between the pair of IoT devices 420-431 traverses. The proximity score can inversely correlate with the proximity of the pair of IoT devices 420-431. For example, the proximity score can be determined to be a value in a range from zero to one, where zero represents a physical distance between the respective physical locations of the pair of IoT devices 420-431 that is above a first proximity threshold value and/or the number of other devices through which communications between the pair of IoT devices 420-431 traverses is above a second proximity threshold value, and one represents a physical distance between the respective physical locations of the pair of IoT devices 420-431 that is below a third proximity threshold value and/or the number of other devices through which communications between the pair of IoT devices 420-431 traverses is below a fourth proximity threshold value.

The data score can be determined to be a value in a range from zero to one, where zero represents a situation in which the pair of IoT devices 420-431 do not generate the same type of data and one represents a situation in which the pair of IoT devices 420-431 exclusively generate the same type of data. For example, assume that a first IoT device 420 generates data types A, B, C and a second IoT device 421 generates data types A, B, C. Since both IoT devices 420, 421 generate the same data types, the data score can be one. If a first IoT device 420 generates data types A, B, C and a second IoT device 421 generates data types D, E, F, the data score can be zero since the IoT devices 420, 421 do not generate/communicate any data types that are the same. Other combinations of data types can produce a data value between zero and one. In illustration, assume a first IoT device 420 generates data types A, B, C and a second IoT device 421 generates data types B, C, D, E, F. In a non-limiting example, the data score for that pair of IoT devices 420, 421 can be determined to be a/2b+c/2d, where a=the number of data types of the first IoT device 420 that match a data type of the second IoT device 421, b=the total number of data types of the first IoT device 420, c=the number of data types of the second IoT device 421 that match a data type of the first IoT device 420, and d=the total number of data types of the second IoT device 421. Thus, the score can be determined to be (2/6)+(2/10)=0.53. Other algorithms can be implemented to determine the data score and the present arrangements are not limited in this regard.

In an arrangement, the fog computing node 120 (or another fog computing node, cloud computing node 125 or other data processing system) can train a classifier to determine correlation scores. The classifier can be a component of the fog computing node 120 (or another fog computing node, cloud computing node 125 or other data processing system) executed by a processor. The classifier can be trained using artificial intelligence/machine learning. In illustration, the classifier can determine which IoT devices 420-431 are presently communicatively linked to one another and determine signal strength of communications between the pair of IoT devices 420-431 those IoT devices 420-431. For example, the classifier can access, and process, signal strength data generated by the IoT devices 420-431 indicating strength of signals received from other IoT devices 420-431 and/or network infrastructure through which signals from other IoT devices 420-431 are received. The classifier also can determine whether pairs of IoT devices 420-431 previously were communicatively linked, but currently are not communicatively linked. The classifier can make such determination, for example, by processing one or more data logs indicating IoT device connection histories.

Further, the classifier can determine the proximity of each pair of IoT devices 420-431 to one another. For example, the classifier can access and process location data indicating the physical location of each IoT device 420-431. The location data can be user specified or, in cases in which IoT devices 420-431 include positioning systems (e.g., GPS receivers or local positioning systems), the data can be generated by the positioning systems. The classifier also can determine similarity of type(s) of data generated and/or communicated by each of the pair of commutatively linked IoT devices 420-431. For instance, the classifier can access data type data indicating the type(s) of data generated by each IoT device 420-431. The classifier can access the data type data from the IoT devices 420-431, from fog computing nodes 120 to which the IoT devices 420-431 are presently, or have been, communicatively linked, and/or the data type data can be user defined.

The classifier can assign initial weightings to the various parameters processed to determine the correlation scores. As noted, the various parameters can include, for example, the signal strength scores, the connection scores, the proximity scores and the data type scores. The initial weightings can be, for example, user defined. Using artificial intelligence/machine learning, the classifier can train an IoT link model until the IoT link model determines correlation scores that accurately indicate which pairs of IoT devices 420-431 are most closely related with regard to physical proximity, communication signal strengths, connection status and data types. The classifier can train the IoT link mode by recursively adjusting the weightings of the parameters until the correlation scores output by the IoT link model indicate that IoT devices 420-431 that are closely related have higher correlation scores than IoT devices 420-431 that are not closely related.

In illustration, internally correlation scores i can be passed through a binary logistic objective function that converts correlation scores into probabilities. The probabilities σ(i) can be determined, for example, as $$\sigma(i) = \frac{e^i}{1+e^i}.$$

The probabilities can be utilized to minimize a loss in classifying pairs of IoT devices 420-431. For example, in experiments XGBoost, which is a machine learning algorithm, used logarithmic (Log Loss) loss to calculate a difference in predicted score values actual score values value using the following equation:

$$\text{Log Loss} = -\frac{1}{N}\sum_{i=1}^{N}[y_i \log p_i + (1-y_i)\log(1-p_i)],$$

where $y_i$ is the correlation score for a pair of IoT devices 420-431 and $p_i$ is the probability of the correlation score occurring. In other words, during the training cycles, Log Loss cumulates the probability of the correlation score assuming a state in which a score is 0 represents a condition in which a pair of IoT devices 420-431 are not related and a state in which a score is 1 represents a condition in which a pair of IoT devices 420-431 are related.

The classifier having been trained by training the IoT link model, using the classifier the fog computing node 120 (or another fog computing node, cloud computing node 125 or other data processing system) can determine a correlation score between each pair of IoT devices in a given set of IoT devices. For example, the classifier can determine a correlation score between each IoT device 420-431 and each other IoT device 420-431. The classifier also can determine correlation scores for other sets of IoT devices. In illustration, the classifier can receive data indicating a set of IoT devices, signal strength data indicating signal strengths between various ones of the IoT devices, connection data indicating which IoT devices currently are communicatively linked and which IoT devices currently are not, but previously were, communicatively linked, proximity data indicating the proximity of the IoT devices with respect to one another and/or data type data indicating the type(s) of data generated and/or communicated by each of the IoT devices. The classifier can process such data using the trained IoT link model to determine the various correlation scores between the various pairs of IoT devices.

The fog computing node 120 can analyze each correlation score to determine whether the correlation score at least equals a threshold value, for example a user defined threshold value. In a non-limiting example, if the correlation scores are normalized to range from zero to one, the threshold value can be set to be 0.5. For each pair of IoT devices 420-431 for which the correlation score meets or exceeds the threshold value the fog computing node 120 can determine that pair of devices both should be communicatively linked and assigned to the same fog computing node. Further, for each pair of IoT devices 420-431 for which the correlation score is below the threshold value the fog computing node 120 can determine that pair of devices should not be communicatively linked nor assigned to the same fog computing node.

In illustration, if the correlation score between IoT devices 420, 421 meets or exceeds the threshold value, then the fog computing node 120 can determine that the IoT devices should be communicatively linked and assigned to a first fog computing node. If the correlation score between IoT devices 421, 422 does not exceed the threshold value, then the fog computing node 120 can determine that IoT devices 421, 422 should not be communicatively linked. Further, the fog computing node 120 can determine that the IoT device should not be assigned to the first fog computing node. For example, the IoT device 422 and other IoT devices 423-431 with which the IoT device 422 has a correlation score exceeding the threshold value can be assigned to a second fog computing node, and so on. Moreover, the first fog computing node to which the IoT devices 420, 421 are assigned can be a fog computing node that, from among fog computing nodes that process the type of data generated/ communicated by the IoT devices 420, 421, is physically closest to the IoT devices 420, 421. Similarly, the second fog computing node to which the IoT device 422 is assigned can be a fog computing node that, from among fog computing nodes that process the type of data generated/communicated by the IoT device 422, is physically closest to the IoT device 422.

Further, the fog computing node 120 (or another fog computing node, cloud computing node 125 or other data processing system) can, in the augmented connection graph 500, indicate false positives and true negatives. A false positive is a condition in which a pair of IoT devices have a correlation score equal to or above a threshold value, but presently they are not communicatively linked. A true negative is a condition in which a pair of IoT devices have a correlation score below a threshold value, but presently they are communicatively linked.

In illustration, if the correlation score between IoT devices 420, 421 at least equals the threshold value, but the IoT devices 420, 421 presently are not communicatively linked, the fog computing node 120 can create an augmented connection 530 between the IoT devices 420, 421, indicating a false positive between the IoT devices 420, 421. Similarly, if the correlation score between IoT devices 425, 431 at least equals the threshold value, but the IoT devices 425, 431 presently are not communicatively linked, the fog computing node 120 can create an augmented connection 532 between the IoT devices 425, 431, indicating a false positive between the IoT devices 425, 431. The fog computing node 120 can assign a tag or other metadata to the augmented connections 530, 532 that causes a visual effect to be applied to the augmented connections 530, 532 when the augmented connection graph 500 is presented on a display. Such visual effect can facilitate identification, by a user, of a communication link that should be added between the IoT devices 420, 421 and a communication link that should be added between the IoT devices 425, 431.

If the correlation score between IoT devices 424, 429 does not exceed the threshold value, but the IoT devices 424, 429 presently are communicatively linked, the fog computing node 120 can indicate in the augmented connection graph 500 a true negative between the IoT devices 424, 429. The true negative can indicate that the communication link 443 is to be removed. For example, the fog computing node 120 can assign a tag or other metadata to the communication link 443 indicating the true negative. The tag or other metadata can cause a visual effect to be applied to the augmented connection graph 500 when the augmented connection graph 500 is presented on a display. Such visual effect can facilitate identification, by a user, of the communication link 443 that should be removed between the IoT devices 424, 429.

Although a user may add and remove communication links based on the false positives and true negatives indicated in the augmented connection graph 500, this need not be the case. Indeed, the fog computing node 120 can, based on determination of the false positives and true negatives indicated in the augmented connection graph 500, automatically initiate creation communication links indicated by the false positives and removal communication links indicated by the true negatives. For example, the fog computing node 120 automatically can access IoT devices 420-431 via one or more communication networks and configure the IoT devices 420-431 to add or remove communication links as indicated by the augmented connection graph 500.

Figure 6:
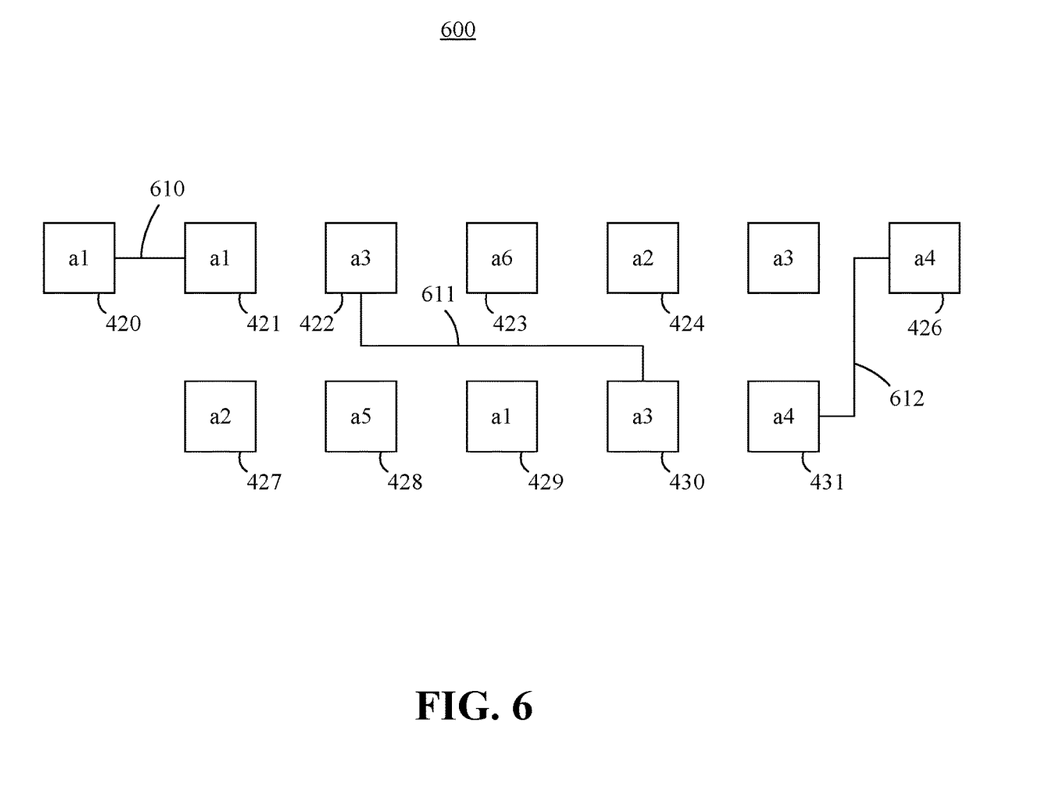
FIG. 6 is an example connection graph depicting proposed connections between IoT devices.

FIG. 6 is an example connection graph 600 depicting proposed connections 610, 611, 612 (e.g., communication links) between IoT devices 420-431 that are to be assigned to a fog computing node 120. In this example, the connection graph 600 can recommend a connection 610 be established between IoT devices 420, 421, a connection 611 be established between IoT devices 422, 430, and a connection 612 be established between IoT devices 426, 431. The fog computing node 120 (or another fog computing node, cloud computing node 125 or other data processing system) can automatically create the connection graph 600 based on the augmented connection graph 500.

The connection graph 600 can be created using a Steiner Tree based algorithm. In illustration, let the set D represent the IoT devices 420-431. Let $D_0$ be the set of IoT devices 420, 421, 422, 424, 425, 426, 427, 429, 430, 431 that communicate data types a1, a2, a3, a4 required by the fog computing node 120. Since IoT devices 423, 428 communicate data types a5, a6, respectively, not required by the fog computing node 120, IoT devices 423, 428 are not included in the set $D_0$. Let D' be an optimized set of IoT devices to be assigned to the fog computing node 120.

Initially, an IoT device from set $D_0$ can be added to set D'. Additional IoT devices from set $D_0$ can be sequentially added, at least temporarily, to set D' to determine whether they are suitable to remain in the set D'. If an IoT device is suitable, it can be kept in the set D'. If an IoT device is not suitable, it can be removed from set D'. In either case, a next IoT device from set $D_0$ can be added to set D' until all IoT devices in set $D_0$ have been evaluated for suitability with regard to being kept in set D'.

A determination also can be made as to whether there is a communication path between the IoT device being evaluated and one or more IoT devices already included in set D'. If so, the IoT device being evaluated can remain, at least temporarily, in set D'. If there is not a communication path between the IoT device being evaluated and one or more IoT devices already included in set D', then the IoT device can be removed from set D' and the process can continue until all IoT devices in set $D_0$ have been evaluated for inclusion in set D'. If the number of IoT devices remaining in set D' exceed a threshold value, the IoT devices can be ranked based on their proximity scores. The threshold number of IoT devices having the highest proximity scores can be kept in set D', and the remaining IoT devices can be removed from set D'. The IoT devices that remain in set D' can be assigned to the fog computing node 120. Accordingly, those IoT devices can communicate data a1, a2, a3, a4 processed by the fog computing node 120.

In illustration, by way of a simple example, assume there are a set of IoT devices 420-431 and each of the IoT devices 420-431 communicates one or more types of data to a fog computing node 120. For example, a first IoT device 420 can communicate to the fog computing node temperature data and humidity data generated by one or more sensors coupled to the first IoT device 420. A second IoT device 421 may only communicate temperature data to the fog computing node 120. Now, assume the fog computing node 120 requires temperature data for a particular task. In this case, a determination can be made as to which IoT device 420, 421 the fog computing node 120 is to receive the temperature data. This can be determined by the fog computing node 120 augmenting the connection graph 400 to generate the augmented connection graph 500. In doing so, the fog computing node 120 can consider both IoT device 420, 421 initially, plus any other IoT devices 422-431 that may be required. The fog computing node 120 can decide which IoT device 420-431 to keep in the final set D' is based on a communication cost. A communication cost for each IoT device 420-431 can be based on the proximity score for the IoT device and each other IoT device in the set D'. The IoT device 420-431 for which the scores are highest can be determined to have the lowest communication cost. The IoT device 420-431 for which the proximity scores are lowest can be determined to have the highest communication cost. The fog computing node 120 can rank each IoT device 420-431 based on their proximity scores, and select the IoT device 420-431 having the highest proximity score (i.e., lowest communication cost), or a threshold number of IoT devices 420-431 having the highest proximity scores (e.g., lowest communication costs), to keep in the set D'. In another example, rather than selecting the IoT device(s) based on the proximity scores, the IoT device(s) can be selected based on their correlation score. For example, an IoT device having the highest correlation score can be selected.

Figure 7:
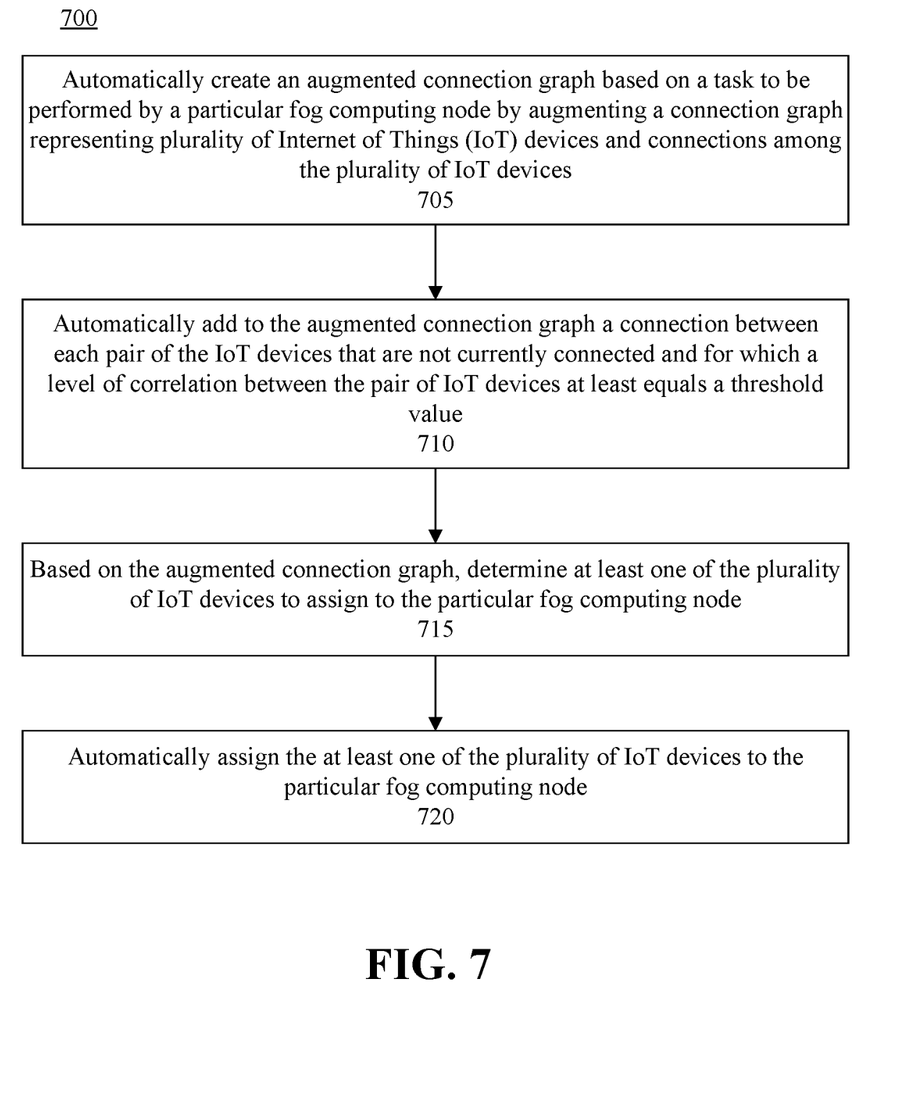
FIG. 7 is a flowchart illustrating an example of a method of assigning IoT devices to a particular fog computing node.

FIG. 7 is a flowchart illustrating an example of a method 700 of assigning IoT devices to a particular fog computing node. Various steps described in the following description of the example method 700 are described as being performed by fog computing node. The method 700 can be implemented by the fog computing node to which the IoT devices are to be assigned or another fog computing node. In other arrangements, the method 700 can be implemented by a cloud computing node or another data processing system.

At step 705 the fog computing node can automatically create an augmented connection graph based on a task to be performed by a particular fog computing node by augmenting a connection graph representing plurality of Internet of Things (IoT) devices and connections among the plurality of IoT devices. The augmenting the connection graph can include adding to the connection graph a plurality of data type nodes, each of the plurality of data type nodes representing a respective type of data processed by a particular fog computing node and, for each of the plurality of data type nodes, adding to the connection graph a connection between the data type node and each of the plurality of IoT devices that generate the type of data represented by that data type node.

At step 710 the fog computing node can automatically add to the augmented connection graph a connection between each pair of the IoT devices that are not currently connected and for which a level of correlation between the pair of IoT devices at least equals a threshold value.

At step 715 the fog computing node can, based on the augmented connection graph, automatically determine at least one of the plurality of IoT devices to assign to the particular fog computing node.

At step 720 the fog computing node can automatically assign the at least one of the plurality of IoT devices to the particular fog computing node.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
automatically creating an augmented connection graph based on a task to be performed by a particular fog computing node by augmenting a connection graph representing plurality of Internet of Things (IoT) devices and connections among the plurality of IoT devices, augmenting the connection graph comprising:
adding to the connection graph a plurality of data type nodes, each of the plurality of data type nodes representing a respective type of data processed by the particular fog computing node; and
for each of the plurality of data type nodes, adding to the connection graph a connection between the data type node and each of the plurality of IoT devices that generate the type of data represented by that data type node;
automatically adding to the augmented connection graph a connection between each pair of the IoT devices that are not currently connected and for which a level of correlation between the pair of IoT devices at least equals a threshold value;
based on the augmented connection graph, automatically determining at least one of the plurality of IoT devices to assign to the particular fog computing node; and
automatically assigning, using a processor, the at least one of the plurality of IoT devices to the particular fog computing node.

2. The method of claim 1, further comprising:
automatically initiating creation communication links between each pair of the IoT devices that are not currently connected and for which a level of correlation between the pair of IoT devices at least equals a threshold value.

3. The method of claim 1, further comprising:
determining at least one pair of IoT devices that currently are connected and for which the level of correlation between that pair of IoT devices is below the threshold value; and
indicating in the augmented connection graph that a communication link between the at least one pair of IoT devices should be removed.

4. The method of claim 3, further comprising:
automatically initiating removal of a communication link between the at least one pair of IoT devices that currently are connected and for which the level of correlation between that pair of IoT devices is below the threshold value.

5. The method of claim 1, wherein the level of correlation between the pair of IoT devices is determined, based at least in part, on a proximity of the pair of IoT devices to one another.

6. The method of claim 1, wherein the level of correlation between the pair of IoT devices is determined, based at least in part, on a signal strength between the pair of IoT devices.

7. The method of claim 1, wherein the level of correlation between the pair of IoT devices is determined, based at least in part, on types of data generated or communicated by each of the pair of IoT devices.

8. A system, comprising:
a processor programmed to initiate executable operations comprising:
automatically creating an augmented connection graph based on a task to be performed by a particular fog computing node by augmenting a connection graph representing plurality of Internet of Things (IoT) devices and connections among the plurality of IoT devices, augmenting the connection graph comprising:
adding to the connection graph a plurality of data type nodes, each of the plurality of data type nodes representing a respective type of data processed by the particular fog computing node; and
for each of the plurality of data type nodes, adding to the connection graph a connection between the data type node and each of the plurality of IoT devices that generate the type of data represented by that data type node;
automatically adding to the augmented connection graph a connection between each pair of the IoT devices that are not currently connected and for which a level of correlation between the pair of IoT devices at least equals a threshold value;
based on the augmented connection graph, automatically determining at least one of the plurality of IoT devices to assign to the particular fog computing node; and
automatically assigning the at least one of the plurality of IoT devices to the particular fog computing node.

9. The system of claim 8, the executable operations further comprising:
automatically initiating creation communication links between each pair of the IoT devices that are not currently connected and for which a level of correlation between the pair of IoT devices at least equals a threshold value.

10. The system of claim 8, the executable operations further comprising:
determining at least one pair of IoT devices that currently are connected and for which the level of correlation between that pair of IoT devices is below the threshold value; and
indicating in the augmented connection graph that a communication link between the at least one pair of IoT devices should be removed.

11. The system of claim 10, the executable operations further comprising:
automatically initiating removal of a communication link between the at least one pair of IoT devices that currently are connected and for which the level of correlation between that pair of IoT devices is below the threshold value.

12. The system of claim 8, wherein the level of correlation between the pair of IoT devices is determined, based at least in part, on a proximity of the pair of IoT devices to one another.

13. The system of claim 8, wherein the level of correlation between the pair of IoT devices is determined, based at least in part, on a signal strength between the pair of IoT devices.

14. The system of claim 8, wherein the level of correlation between the pair of IoT devices is determined, based at least in part, on types of data generated or communicated by each of the pair of IoT devices.

15. A computer program product, comprising:
one or more computer readable storage mediums having program code stored thereon, the program code stored on the one or more computer readable storage mediums collectively executable by a data processing system to initiate operations including:
automatically creating an augmented connection graph based on a task to be performed by a particular fog computing node by augmenting a connection graph representing plurality of Internet of Things (IoT)

devices and connections among the plurality of IoT devices, augmenting the connection graph comprising:
  adding to the connection graph a plurality of data type nodes, each of the plurality of data type nodes representing a respective type of data processed by the particular fog computing node; and
  for each of the plurality of data type nodes, adding to the connection graph a connection between the data type node and each of the plurality of IoT devices that generate the type of data represented by that data type node;
automatically adding to the augmented connection graph a connection between each pair of the IoT devices that are not currently connected and for which a level of correlation between the pair of IoT devices at least equals a threshold value;
based on the augmented connection graph, automatically determining at least one of the plurality of IoT devices to assign to the particular fog computing node; and
automatically assigning the at least one of the plurality of IoT devices to the particular fog computing node.

16. The computer program product of claim 15, wherein the program code is executable by the data processing system to initiate operations further comprising:
  automatically initiating creation communication links between each pair of the IoT devices that are not currently connected and for which a level of correlation between the pair of IoT devices at least equals a threshold value.

17. The computer program product of claim 15, wherein the program code is executable by the data processing system to initiate operations further comprising:
  determining at least one pair of IoT devices that currently are connected and for which the level of correlation between that pair of IoT devices is below the threshold value; and
  indicating in the augmented connection graph that a communication link between the at least one pair of IoT devices should be removed.

18. The computer program product of claim 17, wherein the program code is executable by the data processing system to initiate operations further comprising:
  automatically initiating removal of a communication link between the at least one pair of IoT devices that currently are connected and for which the level of correlation between that pair of IoT devices is below the threshold value.

19. The computer program product of claim 15, wherein the level of correlation between the pair of IoT devices is determined, based at least in part, on a proximity of the pair of IoT devices to one another.

20. The computer program product of claim 15, wherein the level of correlation between the pair of IoT devices is determined, based at least in part, on a signal strength between the pair of IoT devices.

\* \* \* \* \*